Patented Oct. 1, 1935

2,016,112

UNITED STATES PATENT OFFICE 2,016,112

PROCESS FOR PRODUCING BUTYL ALCOHOL AND ACETONE

Alexander Izsak, Central Park, N. J., and Forest J. Funk, Wilmington, Del., assignors to E. I. du Pont de Nemours & Company, Wilmington, Del., a corporation of Delaware No Drawing. Application October 19, 1932, Serial No. 638,596

11 Claims. (Cl. 260—135)

This invention relates to the production of solvents such as normal butyl alcohol and acetone by the fermentation of water soluble nonamylaceous carbohydrates, and more particularly to increasing the efficiency of the fermentation processes.

Various methods have been suggested for the purpose of increasing the yields of the solvents in butyl alcohol, acetone fermentation processes. Fernbach and Strange proposed the addition of degraded yeast as a nitrogenous stimulant. Waters covers the addition of corn gluten as an aid in the butyl fermentation of black strap molasses, while Robinson suggests the step of treating black strap molasses with decolorizing carbon in order to remove inhibitory compounds. Others have proposed the addition of decolorizing carbon to fermentations in general as an accelerant. In England, the addition of dibasic ammonium phosphate has been suggested as a stimulating nutrient in starch mashes low in nitrogen employed for the production of butyl alcohol.

While these materials have overcome the difficulties of the prior practice to a certain extent for one purpose or another, they have not overcome the chief difficulties in butyl alcohol fermentation processes employing water soluble nonamylaceous carbohydrates.

It is well known among those skilled in the art that the bacteria which produce butyl alcohol and acetone are much more sensitive to conditions in their environment than are yeasts. For example, concentrations of soluble fermentable carbohydrates (25–30 Brix) that are readily fermentable by yeasts have such osmotic pressure as ordinarily to prevent the inception or completion of the butyl alcohol fermentation. Moreover acids, either initially present, or formed by the butyl organism itself, may so retard the development and activities of the butyl organism as to greatly delay, or even entirely prevent the fermentation. Furthermore, products, other than fermentable carbohydrates, such as soluble salts, which frequently occur in certain raw materials, e. g., black strap molasses, operate to greatly delay or retard bacterial fermentation. Compounds having a similar effect are those resulting from the destruction of sugar in the production of molasses or incidental to its preparation or fermentation, such as sterilization.

In the normal course of a butyl alcohol fermentation, acids are formed as intermediates between the initial carbohydrates and the final solvent products. During this first, or acid-forming, phase of the fermentation, bacterial development and activity is very rapid. The stage at which the acidity reaches a commonly recognized and desirable maximum, (approximately 3.0 on the Fuller scale), is a critical one. If the fermentation is rapid and successful, the acid reducing powers of the butyl organism are such as promptly and effectively transform these acids to less toxic compounds. Unless such a transforming process sets in promptly, the outcome of the fermentation is deleteriously affected.

An object of our invention is to insure the production and growth of the fermentative organisms. A further object of our invention is to alter the chemical constitution of the mash (or fermentation medium) so as to increase the production of the fermentative organisms. Another object of our invention is to greatly increase the rate of the transformations of carbohydrates to solvents produced by the fermentative organisms. Still another object of our invention is to improve the medium and environment for the fermentation organisms so as to enable them efficiently to ferment mashes containing high concentrations of fermentable material. A still further object of our invention is to speed up the fermentation and improve the process generally. Other objects will appear hereinafter.

These objects may be accomplished according to our invention which comprises the addition of alkaline reacting materials, such as ammonia, ammonium carbonate, ammonium bicarbonate, sodium and potassium carbonates, calcium carbonate, caustic soda, hydrated lime, urea, or the like, to a butyl alcohol fermentation mash of water soluble nonamylaceous carbohydrates.

Our invention is based upon the discovery that, when the alkaline reacting material is added to the mash, the effects of the inhibitory materials at critical stages of the fermentation are eliminated. This is true whether the inhibitory materials are initially present or are produced intermediately as the fermentation progresses. By the addition of the alkaline reacting materials, the inhibiting acids are not only neutralized, but a buffering material is provided for protection against acids not completely neutralized or subsequently formed. Also materials, which are otherwise inhibitory, are precipitated from the mash. The preferred compounds, such as ammonia, ammonium carbonate and urea, also offer nitrogen in a particularly acceptable form for the nutrition of the butyl organism. A particular feature of our invention is that a condition is provided in the fermentation medium that makes it possible for the organism to retain its young vegetative activity along with the older generation throughout the entire course of fermentation.

The alkaline reacting materials may be added to the mash prior to sterilization, after sterilization but prior to fermentation, during fermentation or both prior to and during fermentation. We sometimes find it preferable to add an amount prior to sterilization because we have found that by so doing the fermentation starts more promptly following the inoculation of mashes made from "slow" molasses. We have further found that a similar addition of ammonia made at a properly timed interval after fermentation has started, and in sufficient amount to bring the medium to approximate neutrality, produces a profound effect on the growth and activities of the organism. The treatment of the ferment in this manner furthermore results in the number of cells, per unit volume in the fermenting mash, increasing in a striking manner, during which there is not only an abnormally high population produced but also what may be termed the "age grouping" of the cells remains undisturbed. By this we mean that both young, actively multiplying, extraordinarily motile cells persist throughout the fermentation, carrying on their acid producing function side by side with an ever increasing number of sporulating cells and those which have begun the "fattening" process which is preparatory to spore formation, and represents the stage at which the acid reducing powers of the organisms are apparently greatest.

We have found also that, while there is a wide margin of safety in the quantity of ammonia added to the ferment, the quantities added should be such as to bring the pH of the mash to about 6.7 to 7.0 in order to have the maximum influence on the outcome of the fermentation.

In order to further illustrate our invention and the preferred modes of carrying it into effect, the following examples are given:

*Example 1.*—Two similar fermentations are mashed and seeded in accordance with the following procedure:

250 gallons of black strap molasses containing about 1500 pounds of sugar is diluted with 500 gallons of water in a suitable pressure cooker, heated to 108° C., held for 20 minutes and transferred through a sterile pipe line to a sterilized fermenter containing sufficient sterilized water to produce a final mash of approximately 5000 gallons with a specific gravity of about 6.8 Brix and a sugar content of about 3.9 grams per 100 cc. or 0.326 pound per gallon. This mash is brought to a temperature of 35° C., and "set" by adding 300 gallons of a seed culture, preferably Clostridium saccharobutylicum gamma. The mash is then maintained at a temperature of approximately 32° C. to permit a rapid fermentation.

At the end of 20 hours it will be found that the mash will be evolving gas rapidly, that the specific gravity will have dropped from the original 6.8 Brix to approximately 6.2 the acid will have increased from the original 1.4 degrees on the Fuller scale to approximately 3.8 and the pH will have changed from approximately 6.8 to 5.4. Further the microscope will show a high population of rapidly multiplying and motile organisms.

If now to one of the fermentations (A) approximately 1 part by volume of 26% aqua ammonia is added to each thousand parts of mash so as to reduce the titrable acidity to about 1.8 and the pH to approximately 6.7, while no further treatment is given to the control fermentation (B), a pronounced difference will manifest itself during the subsequent 24 hours. The mash to which the aqua ammonia has been added will ferment much more rapidly, and the bacterial population will increase to an amazing extent. At the end of 92 hours total fermentation time 94% of the total sugar will have been fermented from the ammonia treated mash with the resultant production of approximately 32.5% by weight of mixed solvents, based upon the total original sugar.

On the other hand, the mash not treated with ammonia may produce a yield of say 29.2% in approximately 140 hours by the fermentation of approximately 84.7% of the original sugar. These solvents will consist chiefly of butyl alcohol with from one-third to three-sevenths as much acetone along with much smaller amounts of isopropyl alcohol and traces of ethyl alcohol. These solvents may be recovered from the mash by distillation.

*Example 2.*—450 gallons of a 50% solution of black strap molasses was introduced into a steam cooker, 10 pounds of dibasic ammonium phosphate added and the mash further diluted to 750 gallons with water. It was then cooked at 108° C. for 20 minutes by injecting steam directly into the mash. At the end of this interval it was transferred through a sterilized line and divided equally between two sterile fermenters each containing sufficient sterile cooled water to produce a final mash at a temperature of 30-35° C. with a sugar concentration within the range of 3.5-4.0 grams per 100 cc.

As seed, 600 gallons of similar mash had been prepared and sterilized in final dilution in a suitable seed tank, inoculated with one gallon of a culture of Clostridium saccharobutyricum gamma, incubated at 32° C. for 5 days, and had now developed a large percentage of free spores. After heating to the pasteurization temperature of 63° C. this was divided between the two above described mashes through a carefully sterilized seed line. Fermentation set in within 3-4 hours and was permitted to proceed at the incubation temperature of 34° C. Mash (A) was allowed to finish its normal course without further treatment, but to mash (B) was added rapidly 8 gallons of a 28% solution of aqua ammonia when the fermentation was 20 hours old, a procedure that raised the pH from 5.3 to 6.4. At the end of 80 hours the ammonia treated mash (B) was found to have finished fermentation, having consumed 94.2% of the sugar originally present with the production of butyl alcohol, acetone and isopropyl alcohol to the combined extent of 32.58% by weight of the original sugar. These solvents were composed of butyl alcohol 78.4%, acetone 21.0% and isopropyl alcohol 0.6% by weight. On the other hand, mash (A) which received no ammonia required 137 hours to consume 84.7% of the sugar and produce a corresponding yield of 29.2% of the above named solvents. The above yields are determined by the actual distillation and recovery of the solvents in a commercially acceptable form.

*Example 3.*—3000 pounds of black strap molasses is added to approximately 3000 gallons of water in a suitable mixing tank and dissolved by heating to approximately 85° C. by the injection of steam. The solution is then pumped into a clean fermenter along with sufficient additional water to produce approximately 4500 gallons of mash. The fermenter was then closed and the mash sterilized by injecting steam directly into the mash until it is brought to the temperature of approximately 120° C. The mash is diluted in the process to approximately 5000 gallons by the condensate. After a suitable period, say 30 minutes, the fermenter and its contents are cooled by running water through cooling coils until the temperature has reached 63° C. At this point sufficient aqua ammonia, say 5 gallons, is introduced to bring the mash to approximate neutrality. The neutralized mash is then further cooled to fermentation temperature, 34° C., and inoculated with one gallon of a pure culture of the butyl organism. Fermentation begins promptly and after a total fermentation time of 60–65 hours all of the fermentable sugar has been consumed and the beer is ready for distillation to recover the butyl alcohol, acetone and isopropyl alcohol that have been produced to the extent of say 32.5% by weight of the sugar originally present in the mash.

*Example 4.*—The ammonia can, likewise be added during the cooking of a concentrated molasses solution. Into a 50,000 gallon fermenter that has been sterilized and filled to a suitable level with sterile, cold, water is pumped through a sterile mash line a concentrated molasses cook that has been prepared as follows:

Into a suitable sterilizer containing, say 6000 gallons of water at 90° C., is dropped simultaneously 33,000 pounds of black strap molasses and 120 gallons of 28% aqua ammonia. The mixture is then sterilized by injecting steam until the temperature of 110° C. has been reached when the cook is pumped directly into the fermenter. The resulting final mash containing now approximately 4.4 grams of sugar calculated as invert, per 100 cc. is inoculated with 5000 gallons of actively fermenting pure butyl seed. Fermentation sets in promptly and is complete with substantial yields in 30–60 hours, after which the beer is distilled for recovery of the various solvents.

*Example 5.*—Black strap molasses mashes containing sugar in excess of 5 grams per 100 cc. are ordinarily fermented only partially and slowly with Clostridium saccharobutylicum gamma. However, when aqua ammonia is added to the early stages of a fermenting high sugar mash, sufficient to bring the acidity temporarily to the neutral point a marked increase in fermentation rate and efficiency is produced. For example, if a mash prepared in the same manner as described in Example 3 above, but containing say 6.5 grams of sugar per 100 cc. is inoculated with a 1 gallon seed, fermentation will begin promptly but proceed slowly. When gas evolution is well established and the titrable acidity has reached a point approximately double its original figure, sufficient aqua ammonia is introduced to bring the pH to the neighborhood of 6.8–7.0. Fermentation is thereby markedly accelerated and reaches completion in 60–84 hours and can produce a solvent yield of 28–30% based on the original sugar content.

*Example 6.*—Three black strap mashes (A, B, and C) containing 6.4 grams of sugar per 100 cc. were fermented with Clostridium saccharobutylicum gamma. (A) Received no ingredients other than water and molasses. (B) Received after it had attained an age of 24 hours an ammonium hydroxide addition sufficient to raise its pH from 5.6–6.1. (C) Received a similar quantity of ammonium hydroxide before being sterilized at 5 pound steam pressure for 30 minutes, a treatment to which all three mashes were subjected. At the age of 74 hours (A) which received no ammonia showed a solvent content of 1.1 cc. per 100 cc. corresponding to approximately 14% by weight on the original sugar; (B) which received ammonium hydroxide after fermentation had begun contained 1.63 cc. of solvents per 100 cc. of beer corresponding to a yield of 20.3%; and (C) which received a similar amount of ammonium hydroxide before sterilization showed a solvent content corresponding to a yield of 20.8%.

*Example 7.*—Ammonium carbonate, urea or calcium carbonate may be substituted for the ammonia and added before the final sterilization of the completed mash. These may be added with advantage at the rate of 2 pounds per 1000 gallons of mash.

The above examples disclose fermentation with Clostridium saccharobutylicum gamma. It will be obvious to those skilled in the art that substantially the same results will be obtained with the various strains of this organism including those having the minor differences in cultural characteristics that may be developed therein by processes known to the art. When we employ the term Clostridium saccharobutylicum gamma in the specification and claims, it will be understood that we include such strains and such different cultural characteristics.

From the above examples it will be seen that the use of ammonia in the process reduces the time required for the fermentation to go to completion, permits more complete utilization of fermentable sugar, and consequently the profitable fermentation of mashes containing concentrations of sugar so high as not to be otherwise readily fermentable.

The advantage of the ammonia appears to lie in the combination of its chemical and physical properties, as it is a gas which provides an antiseptic strongly basic water solution which will readily diffuse and reach all portions of a fermenting mash. It is, therefore, easily handled and its manipulation susceptible of nice control.

While ammonia is the preferred alkaline reacting material which we contemplate employing other alkaline reacting materials such for example as non-toxic salts of weak acids, such as ammonium, sodium and potassium carbonates, calcium carbonates, caustic soda, hydrated lime, or amides, such as urea may be substituted for the ammonia with advantageous results, without however obtaining all of the advantages of the ammonia.

While we have disclosed a process for producing butyl alcohol and acetone employing specific amounts of certain ingredients, under definite conditions, it will be apparent to those skilled in the art that many changes and variations may be made in the specific ingredients, and in the proportions and conditions under which they are employed, without departing from the spirit of our invention. Accordingly, the scope of our invention is to be limited solely by the appended claims construed as broadly as is permissible in view of the prior art.

We claim:

1. In the process of producing butyl alcohol and acetone by fermentation of a sterile aqueous solution of water soluble nonamylaceous carbohydrates by means of Clostridium saccharobutylicum gamma, the step which comprises adding to the solution an inorganic alkaline reacting material sufficient in amount to change the acidity of the solution from approximately 3.0 on the Fuller scale to approximate neutrality, the alkaline reacting material being added not later than the time the acidity reaches approximately 3.0 on the Fuller scale and at such times and in such amounts as to avoid giving the solution a pH above 7.0 at any time after sterilization.

2. In the process of producing butyl alcohol and acetone by fermentation of a sterile aqueous solution of water soluble non-amylaceous carbohydrates by means of Clostridium saccharobutylicum gamma, the step which comprises adding to the solution after fermentation has started an inorganic alkaline reacting material sufficient in amount to change the acidity of the solution from approximately 3.0 on the Fuller scale to approximate neutrality, the alkaline reacting material being added not later than the time the acidity reaches approximately 3.0 on the Fuller scale and at such times and in such amounts as to avoid carrying the pH of the solution above 7.0.

3. In the process of producing butyl alcohol and acetone by fermentation of a sterile aqueous solution of water soluble non-amylaceous carbohydrates by means of Clostridium saccharobutylicum gamma, the step which comprises adding to the solution an alkaline reacting material of the group consisting of ammonia and ammonium carbonates sufficient in amount to change the acidity of the solution from approximately 3.0 on the Fuller scale to approximate neutrality, the alkaline reacting material being added not later than the time the acidity reaches approximately 3.0 on the Fuller scale and at such times and in such amounts as to avoid giving the solution a pH above 7.0 at any time after sterilization.

4. In the process of producing butyl alcohol and acetone by fermentation of a sterile aqueous solution of water soluble non-amylaceous carbohydrates by means of Clostridium saccharobutylicum gamma, the step which comprises adding to the solution after fermentation has started an alkaline reacting material of the group consisting of ammonia and ammonium carbonates sufficient in amount to change the acidity of the solution from approximately 3.0 on the Fuller scale to approximate neutrality, the alkaline reacting material being added not later than the time the acidity reaches approximately 3.0 on the Fuller scale and at such times and in such amounts as to avoid carrying the pH of the solution above 7.0.

5. In the process of producing butyl alcohol and acetone by fermentation of a sterile aqueous solution of water soluble non-amylaceous carbohydrates by means of Clostridium saccharobutylicum gamma, the step which comprises adding to the solution prior to sterilization an alkaline reacting material of the group consisting of ammonia and ammonium carbonates sufficient in amount to change the acidity of the solution from approximately 3.0 on the Fuller scale to approximate neutrality.

6. In the process of producing butyl alcohol and acetone by fermentation of a sterile aqueous solution of water soluble non-amylaceous carbohydrates by means of Clostridium saccharobutylicum gamma, the step which comprises adding to the solution ammonia sufficient in amount to change the acidity of the solution from approximately 3.0 on the Fuller scale to approximate neutrality, the ammonia being added not later than the time the acidity reaches approximately 3.0 on the Fuller scale and at such times and in such amounts as to avoid giving the solution a pH above 7.0 at any time after sterilization.

7. In the process of producing butyl alcohol and acetone by fermentation of a sterile aqueous solution of water soluble non-amylaceous carbohydrates by means of Clostridium saccharobutylicum gamma, the step which comprises adding to the solution after fermentation has started ammonia sufficient in amount to change the acidity of the solution from approximately 3.0 on the Fuller scale to approximate neutrality, the ammonia being added not later than the time the acidity reaches approximately 3.0 on the Fuller scale and at such times and in such amounts as to avoid carrying the pH of the solution above 7.0.

8. In the process of producing butyl alcohol and acetone by fermentation of a sterile aqueous solution of water soluble non-amylaceous carbohydrates by means of Clostridium saccharobutylicum gamma, the step which comprises adding to the solution prior to sterilization ammonia sufficient in amount to change the acidity of the solution from approximately 3.0 on the Fuller scale to approximate neutrality.

9. In the process of producing butyl alcohol and acetone by fermentation of a sterile aqueous solution of water soluble non-amylaceous carbohydrates by means of Clostridium saccharobutylicum gamma, the step which comprises adding to the solution, after fermentation has started and when the acidity has reached approximately 3.0 on the Fuller scale, an inorganic alkaline reacting material sufficient in amount to bring the pH of the solution up to between about 6.7 and exactly 7.0.

10. In the process of producing butyl alcohol and acetone by fermentation of a sterile aqueous solution of water soluble non-amylaceous carbohydrates by means of Clostridium saccharobutylicum gamma, the step which comprises adding to the solution, after fermentation has started and when the acidity has reached approximately 3.0 on the Fuller scale, an alkaline reacting material of the group consisting of ammonia and ammonium carbonates sufficient in amount to bring the pH of the solution up to between about 6.7 and exactly 7.0.

11. In the process of producing butyl alcohol and acetone by fermentation of a sterile aqueous solution of water soluble non-amylaceous carbohydrates by means of Clostridium saccharobutylicum gamma, the step which comprises adding to the solution, after fermentation has started and when the acidity has reached approximately 3.0 on the Fuller scale, ammonia sufficient in amount to bring the pH of the solution up to between about 6.7 and exactly 7.0.

ALEXANDER IZSAK.
FOREST J. FUNK.

CERTIFICATE OF CORRECTION.

Patent No. 2,016,112. October 1, 1935.

ALEXANDER IZSAK, ET AL.

It is hereby certified that error appears in the printed specification of the above numbered patent requiring correction as follows: Page 1, first column, line 50, for "or" read for; and that the said Letters Patent should be read with this correction therein that the same may conform to the record of the case in the Patent Office.

Signed and sealed this 19th day of November, A. D. 1935.

Leslie Frazer (Seal)

Acting Commissioner of Patents.